(12) United States Patent
Geslison et al.

(10) Patent No.: US 11,089,792 B2
(45) Date of Patent: Aug. 17, 2021

(54) FORMING DEVICE AND METHOD

(71) Applicants: Richard Byron Geslison, Twin Falls, ID (US); David B. Perry, Twin Falls, ID (US); Cody Lynn Hollibaugh, Dietrich, ID (US)

(72) Inventors: Richard Byron Geslison, Twin Falls, ID (US); David B. Perry, Twin Falls, ID (US); Cody Lynn Hollibaugh, Dietrich, ID (US)

(73) Assignee: GLANBIA NUTRITIONALS LTD., Kilkenny (IE)

( * ) Notice: Subject to any disclaimer, the term of this patent is extended or adjusted under 35 U.S.C. 154(b) by 0 days.

(21) Appl. No.: 15/001,204

(22) Filed: Jan. 19, 2016

(65) Prior Publication Data

US 2016/0205962 A1    Jul. 21, 2016

Related U.S. Application Data

(60) Provisional application No. 62/105,182, filed on Jan. 19, 2015.

(51) Int. Cl.
*A23C 19/09* (2006.01)
*A01J 25/15* (2006.01)
*A23C 19/06* (2006.01)

(52) U.S. Cl.
CPC .......... *A23C 19/0908* (2013.01); *A01J 25/15* (2013.01); *A23C 19/06* (2013.01); *A23C 19/09* (2013.01); *A23V 2002/00* (2013.01)

(58) Field of Classification Search
CPC ..... A23C 19/0908; A23C 19/09; A23C 19/06; A01J 25/12; A01J 25/123; A01J 25/13; A01J 25/15
See application file for complete search history.

(56) References Cited

U.S. PATENT DOCUMENTS

| | | | | |
|---|---|---|---|---|
| 2,813,028 A | * | 11/1957 | Jackson, Jr. ......... | A23C 19/072 426/8 |
| 3,468,026 A | * | 9/1969 | Charles .................. | A01J 25/112 99/454 |
| 3,481,747 A | * | 12/1969 | Berge ....................... | A01J 25/11 426/416 |
| 3,510,944 A | * | 5/1970 | Johanski, Jr. .......... | B26D 3/185 83/14 |
| 4,382,969 A | * | 5/1983 | Sadler ..................... | A01J 27/04 100/39 |
| 5,324,529 A | * | 6/1994 | Brockwell ............ | A01J 25/002 425/217 |

(Continued)

*Primary Examiner* — Seyed Masoud Malekzadeh (57) ABSTRACT

Disclosed is a device for forming cheese blocks of dimensions that facilitate slicing without first having to larger cut blocks of cheese to appropriate dimensions. The device comprises: (a) a pipe adapter having a proximal end and a distal end; (b) a forming chamber of internal dimensions for forming a sliceable cheese loaf, wherein the forming chamber having a proximal end and a distal end, and wherein the proximal end is fluidly connected to the distal end of the pipe adapter; (c) a portal cover, positioned to open or close a portal located at the distal end of the forming chamber; (d) a packaging attachment adapter located at the distal end of the forming chamber; (e) a packaging support device supporting a package positioned to receive the cheese loaf.

1 Claim, 4 Drawing Sheets

(56) References Cited

U.S. PATENT DOCUMENTS

| | | | | |
|---|---|---|---|---|
| 5,749,204 | A * | 5/1998 | Bokelmann | B65B 3/04 426/130 |
| 5,792,500 | A * | 8/1998 | Housset | A01J 25/002 426/582 |
| 5,948,459 | A * | 9/1999 | Telford | A01J 25/12 426/512 |
| 6,337,099 | B2 * | 1/2002 | Hoogland | A01J 25/12 426/517 |
| 6,468,570 | B1 * | 10/2002 | Haddad | A01J 25/112 425/140 |
| 6,942,888 | B2 * | 9/2005 | Mueller | A01J 25/002 426/495 |
| 7,758,905 | B2 * | 7/2010 | Holmes | A01J 27/04 426/516 |
| 8,377,490 | B2 * | 2/2013 | Holmes | A23C 19/0684 426/516 |
| 2004/0144262 | A1 * | 7/2004 | Mueller | A23C 19/06 99/455 |
| 2007/0065550 | A1 * | 3/2007 | Rivero | A21C 9/04 426/515 |
| 2007/0166448 | A1 * | 7/2007 | Holmes | A01J 27/04 426/582 |
| 2007/0178212 | A1 * | 8/2007 | Holmes | A23C 19/0684 426/582 |
| 2010/0098828 | A1 * | 4/2010 | Young | A01J 25/13 426/582 |

* cited by examiner

FORMING DEVICE AND METHOD

FIELD OF THE INVENTION

The invention relates to systems and methods for processing dairy cheese. More specifically, the invention relates to machines and methods for forming cheese blocks of sizes that facilitate ease of slicing, and for incorporating inclusions into cheese.

BACKGROUND OF THE INVENTION

Cheese is a nutritious food that is popular worldwide. Yearly production of cheese is in the billions of pounds, and in the U.S. alone, approximately one-third of the milk produced annually is used for cheese processing. The popularity of cheese is attributable to a variety of advantages associated with the product, including convenience, variety of flavors and textures, and utility as an ingredient in recipes from main courses to desserts, whether cooked or uncooked.

Cheese processing is both an art and a science. Cheese is a product that is significantly influenced by starting materials, processing conditions, additives, etc., and depending upon those various factors, a cheese maker may produce a fresh cheese or an aged cheese, a soft cheese, a semi-soft cheese, a semi-hard cheese, or a hard cheese. The final product may be a cheddar, mozzarella, Asiago, Gouda, Havarti, Colby, or any one of the more than 2,000 kinds of cheeses made around the world.

Sliced cheeses have been popular for many years and are gaining in popularity. Consumers like the convenience of pre-sliced cheese, and companies have responded by adding more varieties to the selections available in the dairy case at the grocery store or market. One general size category of slices includes those that fit neatly between two slices of sandwich bread, although this is a size that is not standardized in the industry. The ability to provide a variety of consumer options for shapes and sizes of blocks would therefore be a distinct advantage. However, commercial cheese production is of such a scale that the blocks of cheese that are produced in cheese manufacturing plants are generally quite large (e.g., 40+ pound blocks, 14-15 inches long, 11-12 inches wide, and 7+ inches high; 640 pound blocks, with dimensions of 22×28×28 inches). Transforming these large blocks after aging generally requires additional processing steps such as "deboxing" the cheese and cutting the large blocks into smaller blocks which can more easily be sliced. This is often done at a second manufacturing site, where blocks are cut to provide smaller blocks of particular size and/or weight. Machines for performing deboxing have been developed in order to automate that process, and machines for cutting large cheese blocks are also commercially available. However, the need to debox large cheese blocks, cut the blocks into sliceable blocks, and repackage the smaller blocks, adds to the time and cost of manufacture. Large blocks of cheese are generally cut to form smaller blocks, such as those from which slices may be made. Depending upon the irregularity of the edges and corners of the larger block, the sizes of the smaller blocks cut from it, and the method used for cutting the blocks, significant amounts of "trim" may be produced, which may result in wasted product if it is not further processed in order to utilize it in additional products. Some have suggested that trim levels can be as much as 18 to 24 percent from 640-lb. blocks (N. Hadad, et al. U.S. Pat. No. 6,468,570).

Each of these issues introduces a need for additional processing steps, development of methods for minimizing waste, etc. Significant effort has been directed over the years toward improving processes for producing, cutting, and packaging cheese. For example, U.S. Pat. No. 3,510,944 (J. G. Johanski, Jr.) describes a "Giant Cheese Block Handling and Cutting Machine." Brockwell (U.S. Pat. No. 5,324,529) describes a "Process of and Apparatus for Handling Green Cheese." Hadad, et al. (U.S. Pat. No. 6,468,570) describe "Methods and Apparatus for Making Precise Weight Cheese Products" (to address the issue of waste due to trim losses). Bokelman et al. (U.S. Pat. No. 5,749,204) describe a "Bulk Cheese Transfer and Containerizing System," stating that "[o]ne of the basic problems which must be addressed and solved in the vertical bulk cheese transfer and containerization process is to hold the shape of the cheese as it is discharged from the tower and being transferred into a container" (column 1, lines 27-31).

Several patents disclose methods that have been designed to address the need for producing sliceable blocks of cheese. For example, Berge et al. (U.S. Pat. No. 3,481,747, issued 2 Dec. 1969) discloses the use of a stream of water to convey and support shaped extruded cheese, the water stream being important to cool and support the cheese to limit crumbling or deformation. Jackson (U.S. Pat. No. 2,813,028, issued 12 Nov. 1957), describes the extrusion of cheddar curds into a sausage-like casing of plastic film. Sadler (U.S. Pat. No. 4,382,969, issued 10 May 1983) discloses a method for treating cheese by comminuting cheese off-cuts (i.e., trim). Housset (U.S. Pat. No. 5,792,500, issued 11 Aug. 1998) discloses the use of a die "adapted to texture, shape, and cool the product." Mueller (U.S. Pat. No. 6,942,888, issued 13 Sep. 2005) discloses a cheese extruding machine that continuously forms and cuts blocks of cheese, the device having an elongated tube for forming the cheese, a cooling device being positioned around a portion of the tube to firm the cheese as it moves through the tube. Holmes et al. (U.S. Pat. Nos. 7,758,905 and 8,377,490, issued 20 Jul. 2010 and 19 Feb. 2013, respectively) describes a method whereby comminuted pieces of cheese are extruded as sheets, pushed through a die plate under pressure, the sheets being cut into slices.

The production of cheese begins when milk is standardized, a process that may involve steps such as removing fat, adding skim milk, cream, milk powder, evaporated milk, or calcium chloride. Starter culture is added and pH is adjusted by direct or biological means. The most important step is coagulation of casein in the milk to form a gel. This is usually done by the addition of rennet (chymosin) to hydrolyze kappa-casein. Once formed, the gels are relatively stable if left undisturbed, but if broken or cut, they undergo syneresis, and whey is expelled from the gel. In modern cheese manufacturing processes, the curds are used to produce the various cheese products and the whey is collected for use in other important methods and products.

At early stages, the curds are generally not sufficiently knitted together to produce a loaf that is not easily broken. In plants which process large quantities of cheese, compacting of the cheese curds to promote interaction of the curds is accomplished by transferring the curds (and usually the whey, as well) to the top of a block-forming tower, where various means (such as creation of a vacuum to remove air, whey, and moisture) are used to separate the curds from the whey and utilize the weight of the curds in the tower to compact and form blocks of cheese at the bottom. In a cheese tower, the weight of new curds being piled on top of the column aids in removing air, whey, and moisture. Hoogland (U.S. Pat. No. 6,337,099, issued 8 Jan. 2002) describes a block-former for such a tower, as do Robertson, et al. (U.S. Pat. No. 3,468,026), who disclose a "Continuous Cheesemaking Process." Robertson stated that "[a]n increasing volume of cheese is being manufactured commercially by crumbling cheese curd in a mill, mixing the curd with salt, compressing the prepared curd to expel whey and air and cause the particles of curd to fuse together and form a block of natural cheese, wrapping the block in impervious sheet material, and then maturing the cheese under pressure. Previously the prepared cheese curd has been formed into blocks of natural cheese by compressing the curd in individual moulds, but the filling, weighing, compressing and emptying of each mould is a time-consuming operation, and a large number of moulds and presses are required for large scale production." For this reason, the use of block-forming towers presently constitutes the primary method by which large-scale manufacturing of cheese is done. However, some of the disadvantages associated with this method have been discussed above.

Another problem that can be faced in the production of cheese involves the inclusion of additional ingredients into cheese—ingredients such as peppers, onions, caramelized onions, bacon, pieces of one or more other types of cheese, etc. When large-scale production involves the use of equipment and methods such as block-forming towers, the inclusion material is generally admixed into the curds within the tower. Since one process that occurs within the tower is the removal of additional whey from the curds, this can result in the addition of that same flavoring to the whey stream. Unless it is desirable to flavor the whey stream, which is generally unlikely, the result is that a significant amount of usable whey may end up as food for pigs, rather than as a valuable nutritional product for which there is significant worldwide demand.

Methods for forming sliceable cheese blocks must account for the properties of the cheese curd, as well as the impact of additional processing on the properties of the resulting cheese product. For example, as Bokelman (U.S. Pat. No. 5,749,204) observed at column 1, lines 41-50, "[v]ariations in tower processing conditions may result in a cheese from which greater amounts of whey have been extracted. The resulting continuously formed cheese will be significantly more dry and though not tending to flow as would cheese with a higher moisture content, the drier cheeses tend to crumble and fall apart. Therefore, this type of cheese also presents difficult handling problems . . . exacerbated when the tower is utilized to produce large bulk quantities." Commercially useful methods must also take into account the need for maintaining sanitary conditions, for limiting additional steps, packaging, and downstream processing, etc., while producing sliceable or sliced cheese. What are needed are methods that produce sliceable cheese blocks which meet these needs and provide the customer with a cheese block that is ready to slice without significant additional processing or cutting.

SUMMARY OF THE INVENTION

The invention relates to a device for forming shaped loaves of extruder-processed cheese, the device comprising (a) a pipe adapter comprising a proximal and a distal end, the proximal end shaped for attachment to an extruder to receive extruded product as it is expelled from the extruder; (b) a forming chamber of internal dimensions (length and cross-section) suitable for forming a shaped loaf, such as a sliceable cheese loaf, within the chamber, the forming chamber having a proximal end and a distal end, the proximal end of the forming chamber being fluidly (operably) connected to the distal end of the pipe adapter; (c) a portal cover, positioned to open or close a portal located at the distal end of the forming chamber; and (d) a packaging attachment adapter located at the distal end of the forming chamber. The packaging attachment adapter may further comprise a fitted filler head, which in various embodiments may be of metal. The device may also include a packaging support device for supporting a package positioned to receive the cheese loaf after it has been formed in the forming chamber, the package being attached to the packaging attachment adapter at the distal end of the forming chamber. The packaging support device may optionally form part of a conveyor belt or other similar type of package transport system which may be positioned immediately adjacent to the device of the invention to bring each individual package in turn into contact with the packaging attachment adapter.

The invention also relates to a method for forming cheese loaves, the method comprising the steps of (a) transferring extruder-processed cheese constituents through an adapter to a forming chamber of internal dimensions suitable for forming a sliceable cheese loaf, and (b) transferring a formed cheese loaf from the forming chamber directly into a package attached to the forming chamber. In various aspects, the package can be attached to the forming chamber by means of a packaging attachment adapter. In various aspects, the package may be a plastic sleeve, a plastic sleeve enclosed within a cardboard box, etc. The internal shape of the forming chamber can be rectangular, cylindrical, triangular, etc., as desired to create a shaped sliceable loaf. The method may also comprise an intermediate step prior to the step of transferring a formed cheese loaf from the forming chamber, that step comprising detecting an increase in pressure to at least about 3 bar within the forming chamber, whereupon a portal cover for a portal at the distal end of the forming chamber is opened.

Yet another aspect of the invention relates to a method for incorporating inclusions into a finished cheese or cheese product, the method comprising the steps of (a) admixing cheese constituents with at least one inclusion, (b) processing the admixed cheese constituents and at least one inclusion within an extruder, (c) transferring extruded cheese constituents comprising at least one admixed inclusion through an adapter to a forming chamber of internal dimensions suitable for forming a sliceable cheese loaf, and (d) transferring a formed cheese loaf from the forming chamber directly into a package.

In various aspects, the step of transferring the cheese constituents is performed by pumping the processed constituents from an extruder to and through an adapter (i.e., "pipe adapter") which connects the extruder and the forming chamber.

DETAILED DESCRIPTION

The invention relates to a device and method for forming sliceable blocks (i.e., "loaves") of cheese, which may be formed directly from cheese constituents. Cheese "constituents" include, for example, fresh un-ripened (i.e., un-aged) cheese curd, aged cheese, comminuted portions of cheese, or combinations thereof. Cheeses for which the device and method may be used include, but are not limited to, Cheddar, Jack, Colby, Colby Jack, Monterey Jack, Pepper Jack, Gouda, Asiago, Muenster, Manchego, Stirred Curd Mozzarella, Fresh Cheese, Parmesan, Romano, Havarti, Edam, Provolone, imitation cheese, and cheese analogs. The device comprises an attachment, or set of attachments which may be operably connected, for an extruder, the attachment(s) facilitating formation of a sliceable block of cheese from extruder-processed cheese constituents. The method provides a series of steps by which a sliceable block (loaf) of cheese may be made, utilizing the attachment device. The attachment device is also suitable for use with a variety of extruder types and brands.

A "sliceable block" of cheese is generally a portion, or loaf, of relatively smooth surface, having controlled height, width, and length. It will generally have the same cross-sectional dimensions as the finished sliced that is expected to be formed from it. It should be of a texture and overall form that will promote ease of insertion into a slicing machine, as well as ease of forming slices of relatively identical (within acceptable variance parameters) size. A slicing block, or loaf, should have a smooth enough outer surface, when removed from its packaging, to require no further trimming prior to slicing.

The term "device," as used herein, may be interchangeable with the term "system," since the "device" may be, and most often will be, formed of a series of operably-connected parts. Certain parts can also be interchangeable when assembling the system, or device. Where the term "block" is used to identify a product formed by a device of the invention, and/or the method of the invention, it is interchangeable with the term "loaf," which is intended to denote a portion of cheese that is sized to promote easier handling, such as slicing, to provide consumer-friendly sizes of cheese products, such as slices, small blocks, etc. The term "operably connected," as used herein, is intended to mean connected in a manner that allows and/or promotes movement, or flow, of the cheese product and/or its constituents from an extruder, into and through the pipe adapter, into and through the forming chamber, and into appropriate packaging. The term "fluidly connected" is also used to describe this same functionality of connection, especially when it is used in connection with parts of the device through which the softer cheese constituents are moved toward and into the forming chamber. As used to describe the component parts of a device/system of the invention, "proximal" refers to the end closer to the extruder (i.e., the origin of flow of material from the extruder), and "distal" refers to the end farther from the extruder (i.e., more distant from the origin), in terms of the flow of movement of the cheese constituents from the extruder to the forming chamber, and into the appropriate packaging.

Those of skill in the art will recognize that a certain degree of rigidity and strength is desirable in the pipe adapter, forming chamber, etc. of the device of the invention. Therefore, suitable materials for forming these parts will be chosen accordingly. Stainless steel, for example, provides an excellent option for forming the device components, although other options may be known to, and used by, those of skill in the art. Those of skill in the art will also recognize that a system as described herein by the inventors can have broader application in the field of food processing, particularly for those products which may present similar processing issues to those that are encountered by those in the field of cheese processing.

In the method of the invention, curd is removed from a production belt after salting but before it reaches the pressing towers, or, optionally, completed blocks are removed from the production line after the curd has been processed through the pressing towers. If completed blocks are used, the blocks are re-crumbled (e.g., mechanically broken apart) to achieve curd-like consistency again. Fresh (i.e., un-aged) curds are fed directly into an extruder (e.g., "stuffer" style extruder). Using either option, the curds go directly from production to the extruder in a timely manner.

Curds are generally drawn into an extruder by a combination of vacuum pressure, gravity and mechanical motion of the hopper agitators. Inside the feeding chamber of the extruder, air is removed from the product by a stuffer vacuum pump and the curd pieces are pressed together by the mechanism of the stuffer, which will be dependent upon the type of stuffer (e.g., twin screw, gear pump, etc.) used by one of skill in the art. As the curds travel through the feeding mechanism, the mechanical motions of the stuffer steadily close the available space, causing a rapid increase in pressure. As the pressure increases, an opening is provided at the distal end of the feeding chamber, and the pressure forces the curds through this opening and into a pipe adapter of the invention.

Figure 1:
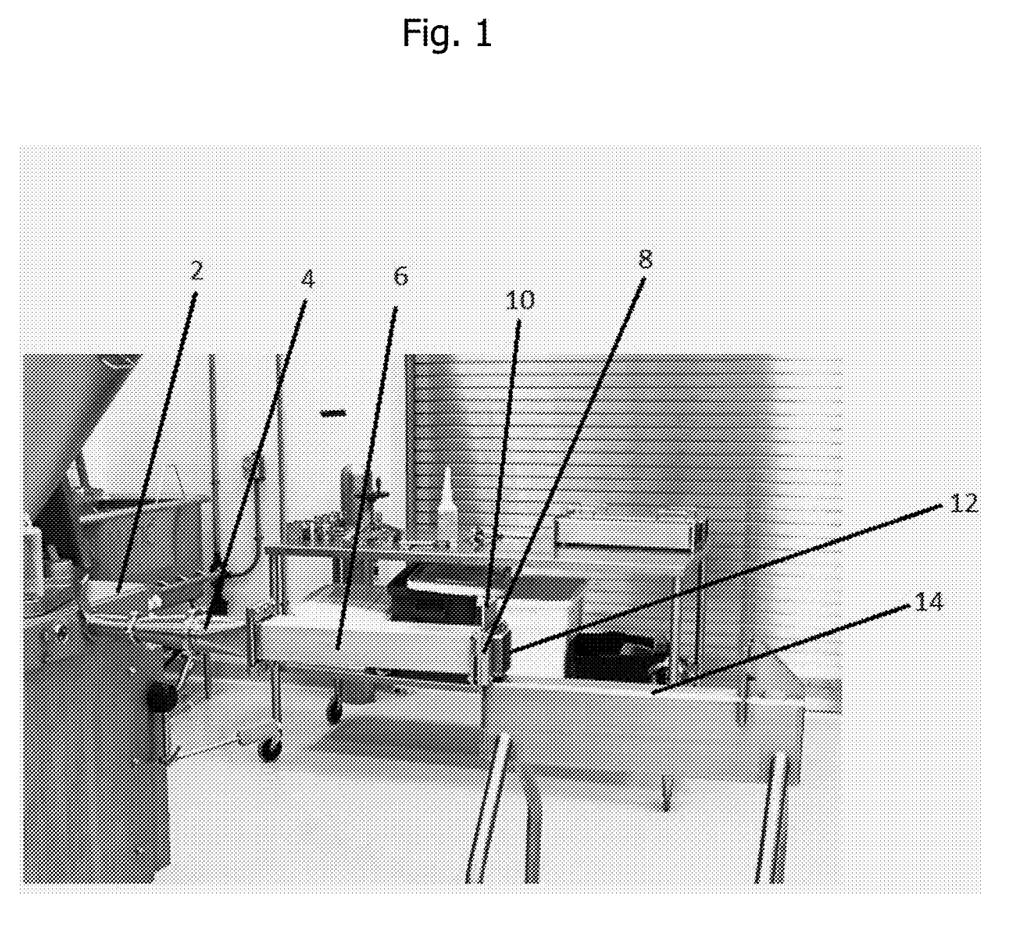
FIG. 1 and FIG. 2 are photographs showing views of a device as described by the invention, with the positioning of the device attached to an extruder being shown in FIG. 1, wherein the proximal end of the pipe adapter (4) is attached to the extruder (2), the forming chamber is attached to the distal end of the pipe adapter, the portal cover (10) is shown in raised position, and the packaging attachment adapter is located at the distal end of the forming chamber. Also shown in FIG. 1 is one embodiment of a packaging support device (14).
Figure 2:
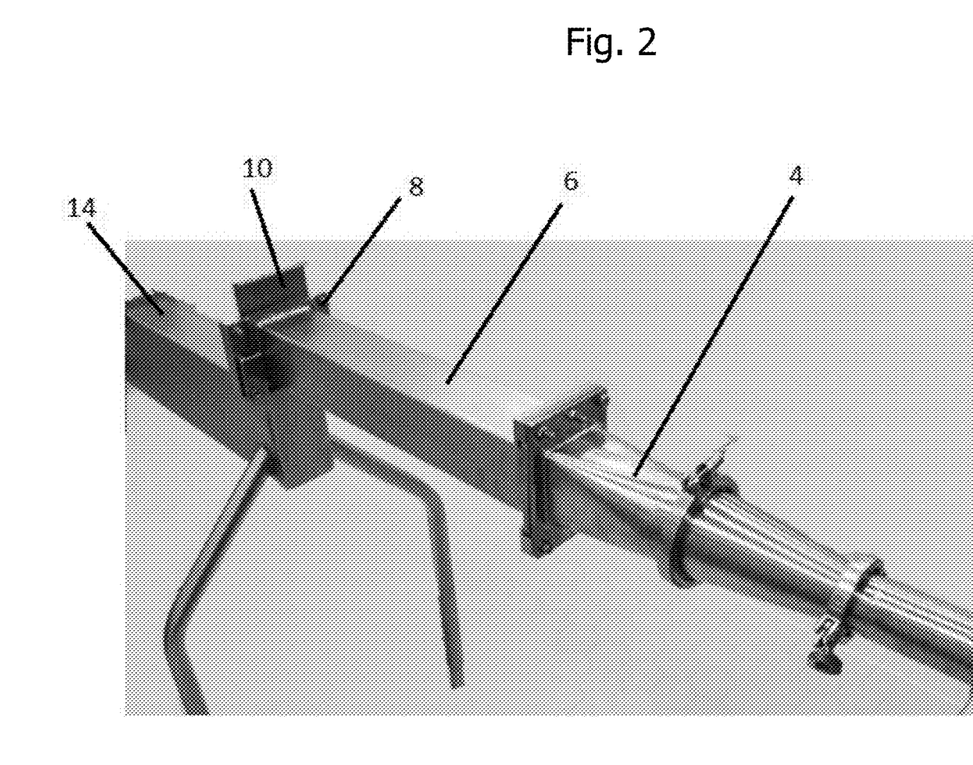
Figure 3:
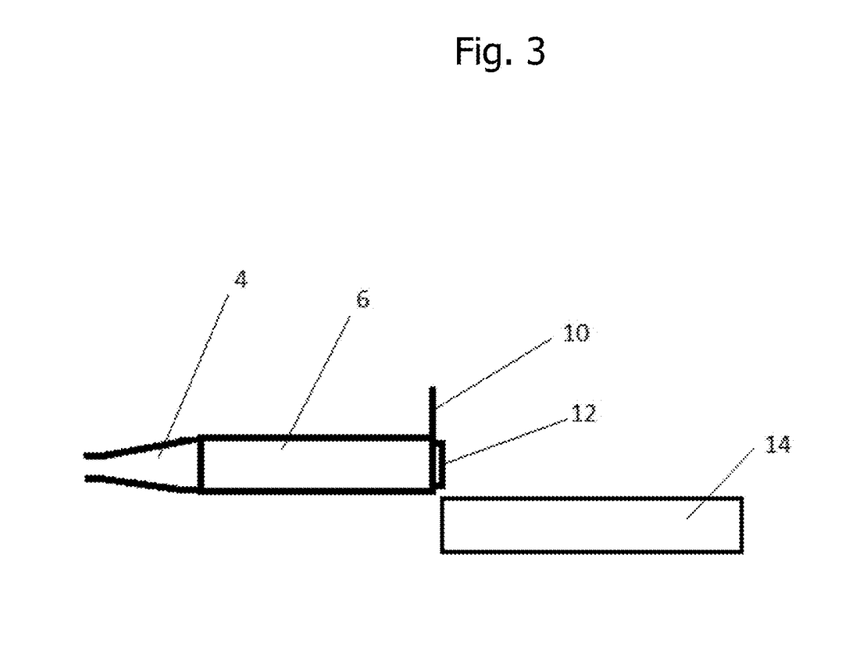
FIG. 3 is a line drawing illustrating a side view of a device for forming cheese loaves after extruder processing.
Figure 4:
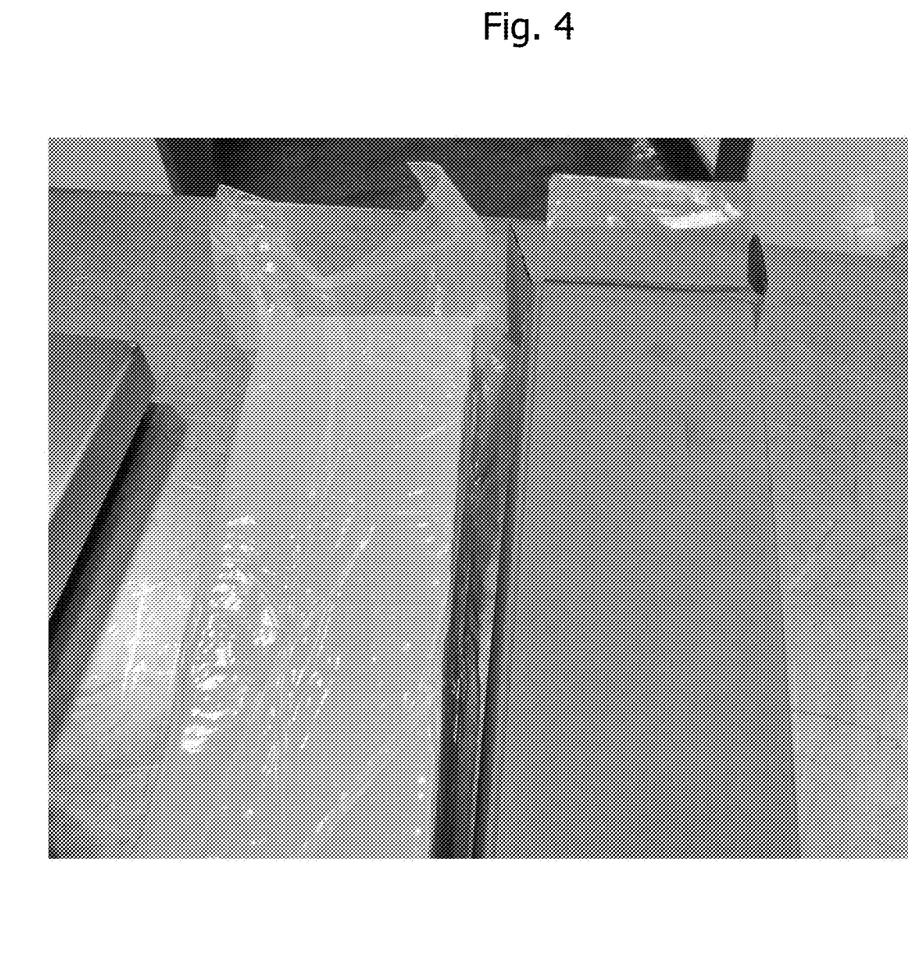
FIG. 4 is a photograph showing a block of cheese formed by the device and method of the invention, the cheese block being encased within a plastic bag that forms the inner layer of a 2-layered package, the outer layer comprising a cardboard box of suitable dimensions to enclose and support a cheese block of approximately the same dimensions as the inner dimensions of the box.

When a sliceable cheese loaf is made by the method of the invention, a fresh curds composition exits the extruder by being fed (extruded) into a forming attachment of the invention. As shown in FIGS. 1 and 2, the forming attachment comprises a pipe adapter (4), forming chamber (6), portal cover for the forming chamber (10) (a portal cover that slides to provide an "open" and a "closed" position for the tube comprising the forming chamber is depicted), and packaging attachment adapter (12), as shown in FIG. 1. The pipe adapter (4) comprises a first, or proximal, end that is fluidly connectable to the extruder (2), and when in operation, is fluidly connected to the extruder. At the proximal end, the pipe adapter diameter is generally about 1.5 inches and a second, or distal, end of the pipe adapter has a dimension that is, for example, 3 inches by 3 inches. The distal end of the pipe adapter is fluidly connected to a forming chamber (6) of dimensions (length and cross-section) suitable for forming a sliceable cheese loaf, the forming chamber having a proximal end and a distal end, the proximal end of the forming chamber being operably, or fluidly, connected to the distal end of the pipe adapter. At the distal end of the forming chamber is a movable portal cover (10), positioned to close a portal (8) located at the distal end of the forming chamber when the process of forming a loaf is taking place. When in operation to receive the extruded curds composition and form a new cheese loaf, the portal cover, which in various embodiments comprises a portal cover which may slide to provide an "open" or "closed" portal, closes the portal and constrains the extruded fresh curds composition within the forming chamber, the pressure within the forming chamber generally being within the range of from about 1 to about 10 bar (i.e., 145 psi). The pressure may vary somewhat, based on the type of cheese being formed. A cheese block is formed of the fresh curds composition within the forming chamber, and, once the block is formed (as determined by the increase in pressure to at least about 3 bar within the 6 forming chamber), the portal cover is moved to a position (i.e., the "open" position) whereby the portal at the distal end of the forming chamber is opened. Pressure exerted on the cheese block by movement of additional extruded fresh curds composition from the extruder into the forming chamber forces the cheese block through the portal at the distal end of the forming chamber and into a package of approximately the same internal dimensions as those of the forming chamber, the package being operably connected to the forming chamber via a packaging attachment adapter (12) attached to the outside of the portal cover at the distal end of the forming chamber and supported by a package support device (14). In various aspects, a suitable package comprises an internal layer comprising a bag made of plastic film and an outer layer comprising a cardboard box, the bag being operably connected to the portal at the distal end of the forming chamber via the packaging attachment adapter. At least one of the packaging layers should comprise a rigid or semi-rigid material, so that the shape of the block from the forming chamber is maintained throughout the aging process for the cheese loaf. The inventors have demonstrated that an outer cardboard box lined with an inner plastic film bag provides excellent results.

The bag and box are sealed, and the one or more sealed loaves produced by the method is/are placed in a cooler and aged for an appropriate time according to the type of cheese being made. The cooling and aging promote knitting together of the curds, while the box supports the fresh cheese until it becomes aged cheese, producing a final formed block of dimensions controlled by the dimensions of the box into which the fresh cheese block has been placed. When cheddar blocks are formed, the blocks are preferably aged for about 3 to about 4 weeks in order to promote a smoother cheese texture.

The method provides fewer risks of contamination of the cheese block than do methods that require the transport of the block or blocks to a second site or station for packaging, such as those methods previously described which use a water stream or a conveyor belt to move the freshly-formed blocks. The method may also provide an advantage in terms of energy costs, because it eliminates the need for a cooling chamber to be located around the block-forming unit. When the packaging comprises a plastic bag/cardboard box combination, it also decreases waste, as the package may be delivered directly to the customer in a ready-to-slice form, eliminating the need for deboxing and repackaging. The cardboard box used for the sliceable block packaging may also be recycled.

Another significant advantage of the device and method of the invention is the opportunity to add additional ingredients, or inclusions, to a finished cheese product as the cheese block is being formed and after the whey has generally been removed. For example, ingredients such as peppers (e.g., jalapenos, red peppers, etc.), onions, bacon, pieces of other types of cheese, etc. may be fed into the extruder in conjunction with the fresh curds and the mixture will be extruded to form a sliceable block that incorporates the additional ingredient(s). This provides unique advantages for large-scale production of inclusion-based cheeses while increasing the amount of usable whey that may be generated during cheese production.

By way of example, when using block-forming towers for cheese production, inclusions may contaminate a whey stream that could, without the presence of the inclusion, be categorized as Kosher or Halal. Utilizing a device and method of the invention, however, allows admixing of the curd and inclusion(s) so that the whey stream can be removed upstream and untouched by the inclusion(s) to be incorporated into the cheese product, allowing recovery of a significant amount of valuable whey. Furthermore, certain inclusions, such as, for example, flax seeds, create clean-in-place issues that are significant enough to limit their use in traditional cheese-forming systems such as block-forming towers. When wet, flaxseeds stick to surfaces. Towers generally comprise internal mesh networks that would catch the sticky flax seeds, making it relatively impossible to efficiently clean the tower and remove all traces of the seeds. The present invention provides a method by which inclusions such as these may be incorporated into cheese without encountering such difficulties.

Yet another benefit that the inventors have noted when using a device and method of the invention is that certain inclusions which have been noted to inhibit curd knitting in other systems can be incorporated into a cheese and/or cheese product using the invention without interfering with the knitting of the cheese curds. For example, curry inclusion has been noted to be problematic in standard systems, but the inventors have demonstrated that a very pleasant curry-flavored cheese may readily be produced using the device and method of the invention to produce the cheese block.

It is important to note that the present invention provides a method by which large quantities of cheese may be produced, including large quantities of inclusion cheeses, as the package support device can comprise a conveyor mechanism for moving new packaging into contact with the packaging attachment adapter of the forming chamber and removing newly-filled packaging as the product exits the forming chamber. While it may be possible to produce various specialty cheeses in small-batch methods without encountering the same issues as those that are encountered during the use of large-scale equipment such as block-forming towers, those methods generally do not lend themselves to use in large-scale production, while the method of the invention has been designed to be, and can be, effective for production of both small- and large-scale cheese production.

Another advantage provided by devices and methods of the invention is the ability to customize the forming chambers to provide shapes and sizes that may be requested by various customers. Currently, large-scale production of cheese tends to be a "one size fits all" operation, making it difficult to meet customer requests for variations in size and shape of resulting blocks. However, forming chambers of the invention may be made in a variety of sizes and shapes, allowing the cheese maker to select from interchangeable parts which determine the ultimate size and shape of the cheese block or loaf produced thereby. Forming chambers can be varied in shape (e.g., round, oval, square, rectangular cross-section), in length, in overall size, etc. A customer can therefore request that a portion of any particular order comprise blocks of smaller cross-section and blocks of larger cross-section, or may request shorter or longer blocks, and the cheese maker can fill the order utilizing the same production line, just changing the forming chambers that are used at the end of the process. Using interchangeable pipe adapters and forming chambers allows the system/device to be customized according to the shape and size of loaf desired.

Similarly, a customer can request that a portion of the resulting cheese have bacon inclusions, that another portion have jalapeno pepper inclusions, etc., and the same initial processing line can be used for both types of cheese, separating the two by utilizing different extruders in the final step.

Cheese cooling can also be facilitated by use of the device and method of the invention, which can result in improved cheese product. A temperature gradient, developed in large blocks (290 kg, 640 lbs) the first 24-48 h after cheese making, may cause moisture migration from warm to cold areas in the cheese blocks during initial cooling (Barbano, D. M., Moisture Nonuniformity and Sampling Errors in Large Cheddar Cheese Blocks, *Journal of AOAC International* Vol. 84, NO. 2, 2001). Initial formation of smaller cheese blocks, facilitated by the device and method of the invention, creates blocks which may be more quickly and uniformly cooled, decreasing potential moisture migration.

The invention has been described for use in making cheese and cheese products from constituents, which can include, for example, cheese curd, comminuted cheese, crumbled cheese curds, cheese crumbles, and other smaller components which can generally be knit together or compressed together to form cheese or a cheese product. The invention provides a significant advancement in the production of these products, and most notably provides an advantage where cheese curds, crumbled cheese curds, or combinations thereof are used and knit together to form a cheese such as, for example, Cheddar cheese. Cheese curds have a characteristic elastic (spring, rubbery) texture that some refer to as "squeaky," because of the sound that is made when they are eaten. Processing these curds to form a cheese block, the curds having been knit together to form a product having the characteristic consistency that is expected of block cheese, is facilitated by the device and method of the invention. Forming, handling, and transporting blocks formed of compressed cheese curds is often complicated by the fact that the blocks, until they have been aged, tend to crumble if appropriate measures are not taken to minimize this effect. This may be even more pronounced at lower moisture levels. A device and method as provided by the invention provide(s) a means by which curds may be compressed and packaged, easily moved to cooling chambers, more easily cooled, and readily transported directly to a customer without going through the various steps that increase the chances that crumbling will occur. The device may be utilized with a variety of extruder types and brands.

The invention will now be further described by means of the following non-limiting examples.

Example 1

Two 40 lbs. blocks of freshly pressed Colored Cheddar curds made from pasteurized milk were collected. The blocks were taken from the production lines immediately after they were expelled from the Wincanton cheese block forming towers but before vacuum sealing and boxing. The blocks were tested and had the following characteristics: Moisture 37.69%, FDB 53.71%, Fat 33.46%, pH 5.32, and Salt 1.71%; and therefore fit the Standard of Identity for Cheddar Cheese required by the United States Code of Federal Regulations, Title 21, Section 133.113.

Once removed from the production lines, the blocks were re-crumbled by breaking the formed blocks back down into curd pieces by mechanical or manual agitation. Curd pieces were then fed into a Karl Schnell P10 Type 588 Vacuum Filler type extruder fitted on the outlet with a custom block forming attachment. Both cheese blocks were kept separate from each other during the re-crumbling and extruder filling steps so that one block could be used with a dairy derived cheese flavor paste (First Choice Ingredients N112 W19528 Mequon Rd. Germantown, Wis. 53022) as an inclusion test. The re-crumbled curd pieces of the inclusion control test block (block #1), were carefully scooped into the hopper of the Karl Schnell Extruder. The curds were not added all at once but were instead added gradually over the course of the run to prevent clumps from forming at the bottom of the hopper and blocking the hopper feed. The temperature of the curds at the time of extrusion was about 89° F.

The Karl Schnell extruder was set to the following parameters: filling capacity (controls the speed of the gear pump) set at 70 lbs/min, vacuum pressure set at 75% (±50%), and the hopper feed speed set at 200% speed (the max setting). Once the extruder was activated, the curds were pulled by the vacuum and hopper agitators into the internal gear pump of the Karl Schnell extruder. Inside the gear pump the curds were caught by the turning motion of the crown and interlinked stationary gear and moved from the gear pump feed at the base of the hopper into the pump. As the crown turned, the gear and crown began to mesh together, catching product between the cogs. The gear and crown continued to turn and the pressure on the curd increased as the cogs closed. The pump outlet opened just as the gear and crown interwoven cogs closed completely, forcing the product (now extruded curds) through into the extruder outlet at high pressure into the custom block forming attachment.

The forming attachment for this process comprises a pipe adapter having a proximal end diameter that fits the circular 1.5" diameter extruder outlet pipe and expands toward the distal end to form a 3 inch by 3 inch square tube with an opening that could be attached to the proximal end of the forming chamber. This tube then feeds cheese constituents into the forming chamber, a length of square tubing the approximate length of the final slicing loaf, that is closed off by a removable slide door at the far end. For this test the forming chamber also had a 3 inch by 3 inch cross-sectional dimension though any cross-sectional shape and dimension are possible for the adapter and the forming chamber, all are dependent on the desired shape and size of the final slicing loaf. As the extruded curds were pushed into this chamber, the product stream hit the closed slide door at the end of the forming chamber, causing the product to fill the chamber forming the slicing loaf shape. Once a pressure of 3-4 bar (about 43.5-58 psi) was read on the Karl Schnell outlet pressure sensor the chamber slide door was opened. On the other side of the slide door is the open end of the slicing loaf box with a bag liner. This box's interior is the finial dimension for the slicing loaf and in this case is about 3 inches by 3 inches by 24 inches long. The cheese from the forming chamber was forced into the inside of the box and liner through a fitted metal filler head which helps hold the box on the box stand and keeps the flow of cheese headed into the box. Once the box was full the slide door on the forming chamber was closed, allowing the chamber to again fill and pressurize. The box was removed from the box holding stand and the bag liner was vacuum sealed. The box was closed and the entire block was labeled and placed in cold storage.

For the inclusion test (block #2), the dairy-derived cheese flavor paste was manually mixed in with the curd pieces until the paste evenly coated the curd surfaces. Once the curds were adequately coated they were scooped into the extruder, and block forming followed the same methods and parameters as for the first block.

After 29 days in cold storage the slicing loaf of inclusion cheese was removed and sliced on a WEBER (Kansas City, Mo. USA) 305 cheese slicer machine. Slicing thickness was set at 2 mm and slicing speed was about 300 slices/minute. A portion of the inclusion block was sliced and then tested for quality.

The tester first gripped one corner of the slice of cheese with the first three digits of the hand. The slice was then waved in the air 10 times with a gentle and smooth motion of the wrist. When the slice was inspected for breakage and other indicators of how well the slice held together, no major breaks were recorded, so the slice passed this test.

Next, another slice was rolled up into a small circular tube of about an inch in diameter. The slice was then unrolled and evaluated for how well the slice held together. Again, the slice passed the test, having no major breakages or openings.

Finally, a slice was tasted by the tester, who noted mouth feel, flavor, and overall experience. The slice was noted to be smooth in texture and strong in flavor (the flavor being that of the dairy-derived flavoring paste). The slice was recorded as passing all tests. It was noted that the slices from this slicing loaf were well formed with good edges, good internal structure (as shown by the shake and fold tests), good texture, and good flavor. This indicated a successful test of the loaf forming system.

Example 2

Three blocks of freshly-pressed Colored Cheddar made from pasteurized milk were obtained from one of the cheese plants owned by Glanbia Foods (Twin Falls, Id.). The blocks were taken from the production lines right after being expelled from Wincanton cheese block forming towers but before vacuum sealing and boxing. Production cheese was tested from this run as having the following characteristics: Moisture 36.84%, FDB 53.07%, Fat 33.52%, 5.19 pH, and Salt 1.46%; thus the blocks fit the Standard of Identity for Cheddar Cheese required by the United States Code of Federal Regulations, Title 21, Section 133.113.

Once removed from the production lines, the blocks were re-crumbled by breaking the formed blocks back down into curd pieces by mechanical and manual agitation. Curd pieces were fed into a Karl Schnell P10 Type 588 Vacuum Filler type extruder fitted on the outlet with a custom block forming attachment. All three blocks were kept separate from each other during re-crumbling and extruding steps. One block was kept as an inclusion test control, one was mixed with a dried chipotle pepper flake (George Chiala Farms 15500 Hill Road Morgan Hill, Calif. 95037), and the third re-crumbled block was mixed with a fine curry seasoning powder (custom in-house made blend, "Kumar blend").

These inclusions were selected due to the nature and difficulties often experienced in making inclusion cheeses. Any inclusion can interfere with curd knit, the process of cheese curds sticking together to make cheese, by physically blocking the necessary curd to curd interactions. Some inclusions cause more problems than others; such as this curry seasoning mix. In the past, the inventors noted that test blocks mixed with this curry mix have fallen apart as soon as they have been removed from the cheese press and hoops, making packaging and aging the block of cheese impossible. It has been noted in these past tests that the seasoning, when mixed into the cheese curds, coats the curds in a fine layer which prevents the curds from knitting together. Chipotle flakes have not caused this problem.

These inclusions were thus chosen to determine how each would perform in this new block forming process: one inclusion that has been noted to work with traditional hooping and pressing (chipotle flakes), one that has been noted not to work with traditional hooping and pressing (curry powder), and a block of cheese to act as an inclusion control.

Settings for the Karl Schnell extruder were: filling capacity 70 lbs./min, vacuum pressure set at 75%, and the hopper feed speed set at 200%. The forming chamber was pressured to 8 bar (about 116 psi) to form each block. These settings were kept constant for all three test runs.

The first block through the block forming process was the inclusion control. After the block was re-crumbled it was carefully scooped into the hopper of the Karl Schnell extruder. The curds were gradually added over the course of the run to prevent clumps from forming and blocking the hopper feed. The temperature of the curds at extrusion was 93° F. The curds were fed from the hopper into the Karl Schnell extruder's gear pump feeding mechanism and then through the pipe adapter forming attachment into the forming chamber. Once a pressure of 8 bar was reached, the slide door was removed and the cheese in the forming chamber was pushed into a slicing loaf box with a liner. When the bag and box were filled, the slide door on the forming chamber was repositioned to close and pressurize the chamber once more, while the bag and box were sealed and placed into cold storage.

The second block was re-crumbled, then manually mixed with chipotle flakes. Once thoroughly mixed, the curds were carefully scooped into the hopper of the Karl Schnell extruder. The curds were gradually added over the course of the run to prevent clumps from forming and blocking the hopper feed. The temperature of the curds at extrusion was 93° F. The curds were fed from the hopper into the Karl Schnell extruder's gear pump feeding mechanism and then through the pipe adapter into the forming chamber. Once a pressure of 8 bar was reached, the slide door was removed and the cheese in the forming chamber was pushed into a slicing loaf box with a liner. Once the bag and box were filled, the slide door on the forming chamber was replaced to pressurize the chamber once more while the bag and box were sealed and placed into cold storage.

The final block was re-crumbled and then manually mixed with an in-house curry seasoning mixture. The curds were mixed thoroughly until all curds were coated evenly. The curds were scooped carefully into the hopper of the Karl Schnell extruder. The curds were gradually added over the course of the run to prevent clumps from forming and blocking the hopper feed. The temperature of the curds at extrusion was 93° F. The curds were fed from the hopper into the Karl Schnell extruder's gear pump feeding mechanism and then through the pipe adapter of the forming attachment into the forming chamber of dimensions of about 3 inches by 3 inches by 24 inches long. Once a pressure of 8 bar was reached, the slide door was removed, opening the forming chamber, and the cheese in the forming chamber was pushed into a slicing loaf box with a liner. Once the bag and box were filled, the slide door on the forming chamber was repositioned to close and pressurize the chamber once more while the bag and box were sealed and placed into cold storage. The enclosed nature of the block forming system successfully prevented the slicing loaves from falling apart during packaging.

Samples from each of these tests were sliced on a Weber 305 cheese slicer at 8 days of age and again at 30 days of age to test the how effective the slicing loaves had formed. Slicing thickness was set at 2 mm with a cutting speed of 300 slices/minute. Slices from each of the three slicing loaves were tested using the shake test, the fold test, and the taste test to evaluate how well the slices had formed.

To perform a shake test, one corner of a slice wass picked up and held between the first three digits of one hand. The slice was then waved in the air 10 times with a gentle motion of the tester's wrist. The slice was then inspected for breaks and holes that may have developed. If a slice holds together without breaking during this test, the slice is said to have passed this test. As this test is dependent on the individual tester to shake the sample, the same tester was used for all samples to maintain consistency.

To perform the fold test, another slice was carefully rolled into a tube of about an inch in diameter. The slice was then unrolled and similarly inspected for breaks and openings in the slice that may have formed in the slice as a result of the test. If a slice holds together without breaking, the slice is said to have passed this test. As this test is dependent on the individual tester to roll or "fold" the sample, the same tester was used for all samples to maintain consistency.

For the third test, one slice was tasted by the tester, noting the flavor, the mouth feel, the slice texture, and the overall eating experience. Passing and failing this test is very subjective and relies on the tester's individual expectations of the slice. Again, to maintain consistency the same tester was used to test all samples and slicing dates.

At 8 days of aging, slices from the inclusion control, the chipotle flake test, and the curry seasoning test were each tested with the three tests listed above. At that time it was noted that the inclusion control and chipotle blocks both passed the shake and fold tests remarkably well for being aged for such a short period of time. It was also noted that while the curry seasoned block failed the shake and fold tests, the results were actually relatively good, considering the time interval for aging. All three samples passed the taste test. All textures were smooth, and no off flavors were noted in any of the slices. For the chipotle cheese slices there was a good chipotle flavor and an after burn that was judged to be not overpowering. The curry slices were noted as being a bit young in texture but having a nice curry flavor.

While the actual age of the cheese at slicing is dependent on the cheese type, the logistics for shipping, and the policies of the company actually slicing the cheese, most cheeses are around a month old at the time of slicing. So at 30 days of age, slices from the inclusion control, the chipotle flake test, and the curry seasoning test were each tested again with the three tests mention previously. Each slice tested passed the shake and fold tests and all slices were well-formed. For the taste tests there were no off flavors and no defective textures recorded. The chipotle cheese slices had excellent flavor and a well-balanced pepper burn. The curry cheese slices had a wonderful curry aroma and a full curry flavor.

Three types of slicing loaf Cheddar cheeses were formed, including standard inclusion control Cheddar, chipotle flake inclusion Cheddar, and a curry seasoning inclusion Cheddar. All loaves of inclusion cheeses were successfully packed and sealed into long slicing loaf boxes, which has previously been problematic using traditional hooping and pressing techniques. All loaves produced well-formed and well-flavored slices of cheese at 30 days of age.

What is claimed is:

1. A device for forming extruder-processed cheese, comprising (a) a pipe adapter comprising a proximal end and a distal end; (b) a forming chamber of internal dimensions for forming a sliceable cheese loaf, the forming chamber having a proximal end and a distal end, the proximal end being fluidly connected to the distal end of the pipe adapter; (c) a slideable portal cover, positioned to open or close a portal located at the distal end of the forming chamber, wherein when in the closed position the portal cover constrains an extruded cheese constituents within the forming chamber; (d) a packaging attachment adapter, comprising a fitted metal filler head, located and attached to an outside of the portal cover at the distal end of the forming chamber; and (e) a packaging support device, in contact with the packaging attachment adapter, for supporting a package positioned to receive the cheese loaf after it has been formed in the forming chamber; wherein the device attaches to the extruder at the proximal end of the pipe adapter.

* * * * *